US 11,405,580 B2

(12) United States Patent
Bartha et al.

(10) Patent No.: US 11,405,580 B2
(45) Date of Patent: Aug. 2, 2022

(54) EVENT CAMERA HARDWARE

(71) Applicant: FotoNation Limited, Galway (IE)

(72) Inventors: Lorant Bartha, Brasov (RO); Corneliu Zaharia, Brasov (RO); Vlad Georgescu, Brasov (RO); Joe Lemley, Galway (IE)

(73) Assignee: FotoNation Limited, Galway (IE)

( * ) Notice: Subject to any disclaimer, the term of this patent is extended or adjusted under 35 U.S.C. 154(b) by 150 days.

(21) Appl. No.: 17/016,133

(22) Filed: Sep. 9, 2020

(65) Prior Publication Data

US 2022/0078369 A1 Mar. 10, 2022

(51) Int. Cl.
*H04N 5/77* (2006.01)
*B60R 11/04* (2006.01)
*H04N 5/14* (2006.01)
*H04N 5/91* (2006.01)
*H04N 7/18* (2006.01)
*B60R 11/00* (2006.01)

(52) U.S. Cl.
CPC ............... *H04N 5/77* (2013.01); *B60R 11/04* (2013.01); *H04N 5/147* (2013.01); *H04N 5/91* (2013.01); *H04N 7/188* (2013.01); *B60R 2011/0003* (2013.01)

(58) Field of Classification Search
None
See application file for complete search history.

(56) References Cited

U.S. PATENT DOCUMENTS 8,089,514 B2 * 1/2012 Shimizu ............. H04N 21/2383
348/154
2002/0054210 A1 * 5/2002 Glier ..................... G08G 1/164
348/E7.087

FOREIGN PATENT DOCUMENTS

EP          3440833 B1      8/2019
WO       2019145516 A1    8/2019
WO       2019145578 A1    8/2019
(Continued)

OTHER PUBLICATIONS

European Patent Office—International Search Authority, International Search Report and Written Opinion of International Application No. PCT/EP2021/066440 filed Jun. 17, 2021; Search Report dated Sep. 24, 2021, 15 pages.
(Continued)

*Primary Examiner* — Hung Q Dang
(74) *Attorney, Agent, or Firm* — Lee & Hayes, P.C.

(57) ABSTRACT

A method of producing an image frame from event packets received from an event camera comprises: forming a tile buffer sized to accumulate event information for a subset of image tiles, the tile buffer having an associated tile table that determines a mapping between each tile of the image frame for which event information is accumulated in the tile buffer and the image frame. For each event packet: an image tile corresponding to the pixel location of the event packet is identified; responsive to the tile buffer storing information for one other event corresponding to the image tile, event information is added to the tile buffer; and responsive to the tile buffer not storing information for another event corresponding to the image tile and responsive to the tile buffer being capable of accumulating event information for at least one more tile, the image tile is added to the tile buffer.

15 Claims, 5 Drawing Sheets

(56) References Cited

FOREIGN PATENT DOCUMENTS

WO            2019180033  A1     9/2019

OTHER PUBLICATIONS

Posch, C, Serrano-Gotarredona, T., Linares-Barranco, B., & Delbruck, T. "Retinomorphic event-based vision sensors: bioinspired cameras with spiking output", Proceedings of the IEEE, 102(10), 1470-1484, (2014).
Scheerlinck, C., Rebecq, H., Gehrig, D., Barnes, N., Mahony, R. and Scaramuzza, D., 2020, "Fast image reconstruction with an event camera", in IEEE Winter Conference on Applications of Computer Vision (pp. 156-163).
Stec, Piotr, PCT Application No. PCT/EP2020/073928 Filed Aug. 27. 2020 entitled "Event-Sensor Camera", 13 pages.
Ryan, et al. U.S. Appl. No. 16/904,122, filed Jun. 17, 2020 entitled "Object Detection for Event Cameras".
Ryan, et al. U.S. Appl. No. 16/941,799, filed Jul. 29, 2020 entitled "Object Detection for Event Cameras".

\* cited by examiner

EVENT CAMERA HARDWARE

FIELD

The present invention relates to a method and a module for forming at least one image frame from event camera information.

BACKGROUND

An event camera is a camera with a sensor whose pixels independently respond to changes in a measured value. For example, each pixel may store a reference brightness, and continuously compare the reference brightness to a measured brightness. If a difference between the measured brightness and the reference brightness exceeds a predetermined threshold in a pixel, that pixel resets its reference brightness and an event is said to have occurred. An event causes an event packet to be generated and to be transmitted by the camera. The contents of an event packet are defined by the type of event camera and/or the configuration of the event camera. The contents comprise the address of the pixel that detected the event and generally a timestamp corresponding to the time at which the event occurred. The contents may comprise the polarity (indicating an increase or decrease) of the detected change, the currently measured value, or the detected change. In operation, an event camera will output an asynchronous stream of event packets that have been triggered by changes in a scene imaged by the event camera.

Examples of event cameras are disclosed in Posch, C, Serrano-Gotarredona, T., Linares-Barranco, B., & Delbruck, T. "*Retinomorphic event-based vision sensors: bioinspired cameras with spiking output*", Proceedings of the IEEE, 102(10), 1470-1484, (2014), European Patent No. EP3440833, PCT Application WO2019/145516 and PCT Application WO2019/180033 from Prophesee.

When employing an event camera, it can still be desirable to reconstruct a textural (or spatial) image using a set of events accumulated over a given time. For example, when a face is being imaged, a reconstructed textural image can be used to determine characteristics such as eye gaze or eye state, such as blink or open, as described in PCT Application WO2019/145578 (Ref: FN-630-PCT), the disclosure of which is incorporated hereby by reference. (It will also be appreciated that wherever spatial image information is available, spectral image information can also be generated.)

Two neural network (NN)-based event camera reconstruction methodologies are: E2VID and Firenet discussed in Scheerlinck, C., Rebecq, H., Gehrig, D., Barnes, N., Mahony, R. and Scaramuzza, D., 2020, "Fast image reconstruction with an event camera", in IEEE Winter Conference on applications of Computer Vision (pp. 156-163).

Also, U.S. patent application Ser. No. 16/904,122 filed on 17 Jun. 2020 and US patent Application Ser. No. 16/941,799 filed on 29 Jul. 2020 entitled "*Object Detection for Event Cameras*", (Ref: FN-662-CIP), the disclosures of which are incorporated hereby by reference, disclose methods for accumulating event information from an event camera in image frame form for applications including object detection, image reconstruction and blink detection.

Summary

The present invention is defined by the independent claims. Further optional features are defined in the dependent claims.

In embodiments of the present invention, the amount of memory required to process event packets from an event camera is reduced relative to known methods by using a tile buffer sized to store information for only a subset of the pixels of the event camera.

Based on the nature of an event camera, it can be assumed that event packets are only generated by pixels that correspond to moving or changing objects. The remainder of the pixels in the sensor of the event camera do not generate event packets and may be considered to relate to non-moving parts of an imaged scene. The present invention prevents memory being unnecessarily allocated for non-moving parts of an imagined scene.

In some embodiments, a preliminary decoder is used either to count received event packets or to extract the time stamp from the received event packets. The number of received event packets or the time of the received event packets determined by the preliminary decoder can then be used to trigger the writing out of one or more image frames.

In some embodiments, additional filtering of the tile buffer is performed to ensure that regions of the event camera sensor generating low numbers of events are removed from the tile buffer. This serves to allows the size of the tile buffer to be minimized and helps avoid the storage of tiles that comprise only noise in the tile buffer.

BRIEF DESCRIPTION OF THE DRAWINGS

Embodiments of the invention will now be described, by way of example, with reference to the accompanying drawings, in which.

DESCRIPTION OF THE EMBODIMENTS

Embodiments of the present invention will now be described by reference to the above-referenced figures.

Figure 1:
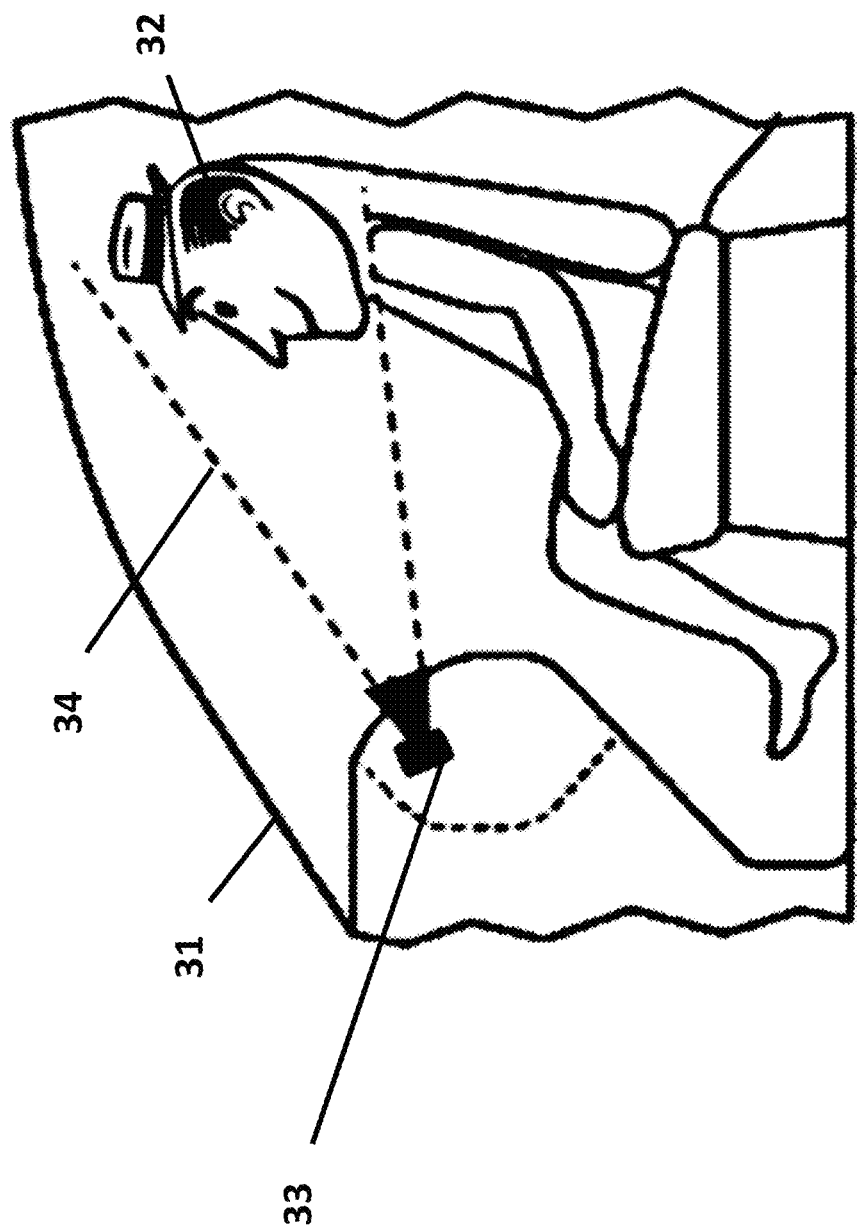
FIG. 1 shows an example of an event camera installed in a vehicle to monitor a driver of the vehicle.

Referring now to FIG. 1, which illustrates an exemplary application in which an embodiment of the present invention can be used. A driver 32 is shown inside a compartment of a vehicle 31. The head of the driver 32 is monitored by a driver monitoring system, DMS. The DMS comprises a user-facing event camera 33 which is configured so that the head of the user 32 is within the field of view 34 of the user-facing event camera 33. The user is the driver 32 of the vehicle 31 and thus the user-facing event camera 33 is a driver-facing event camera. It is however also possible in addition or the alternative in DMS systems, for the event camera to capture images of one or passengers within the field of view.

Embodiments of the present invention are particularly advantageous in situations in which at least a portion of the scene imaged by an event camera does not change. Therefore, the event camera 33 pointed at the unchanging interior of the vehicle 31 is a well-suited application. The present invention is however not limited to vehicular applications and may be used in any situation in which event camera may be used.

The sensitivity of the event cameras used in embodiments of the present invention need not be limited to any specific range of wavelengths, but most commonly will be sensitive to near infra-red, NIR, light and/or visible, RGB, light. The event camera will generally be in the form of a camera module comprising a housing for a lens and a sensor, the lens serving to focus light onto the sensor. The camera module may also have electronics to power the sensor and enable communication with the sensor. The camera module may also comprise electronics to process acquired images. The processing can be low level image signal processing, for example, gain control, exposure control, colour balance, denoise, etc. and/or it can involve more powerful processing for example, for computer vision.

Embodiments of the present invention can be implemented in a module disposed between an event camera sensor and a system bus, for example, an Advanced eXtensible Interface (AXI) bus, with a view to writing image frame information across the bus into system memory, but requiring minimal intermediate memory for doing so. Nonetheless, it is possible for the event sensor to provide event information (in parallel) directly into main memory or to other modules.

Figure 2:
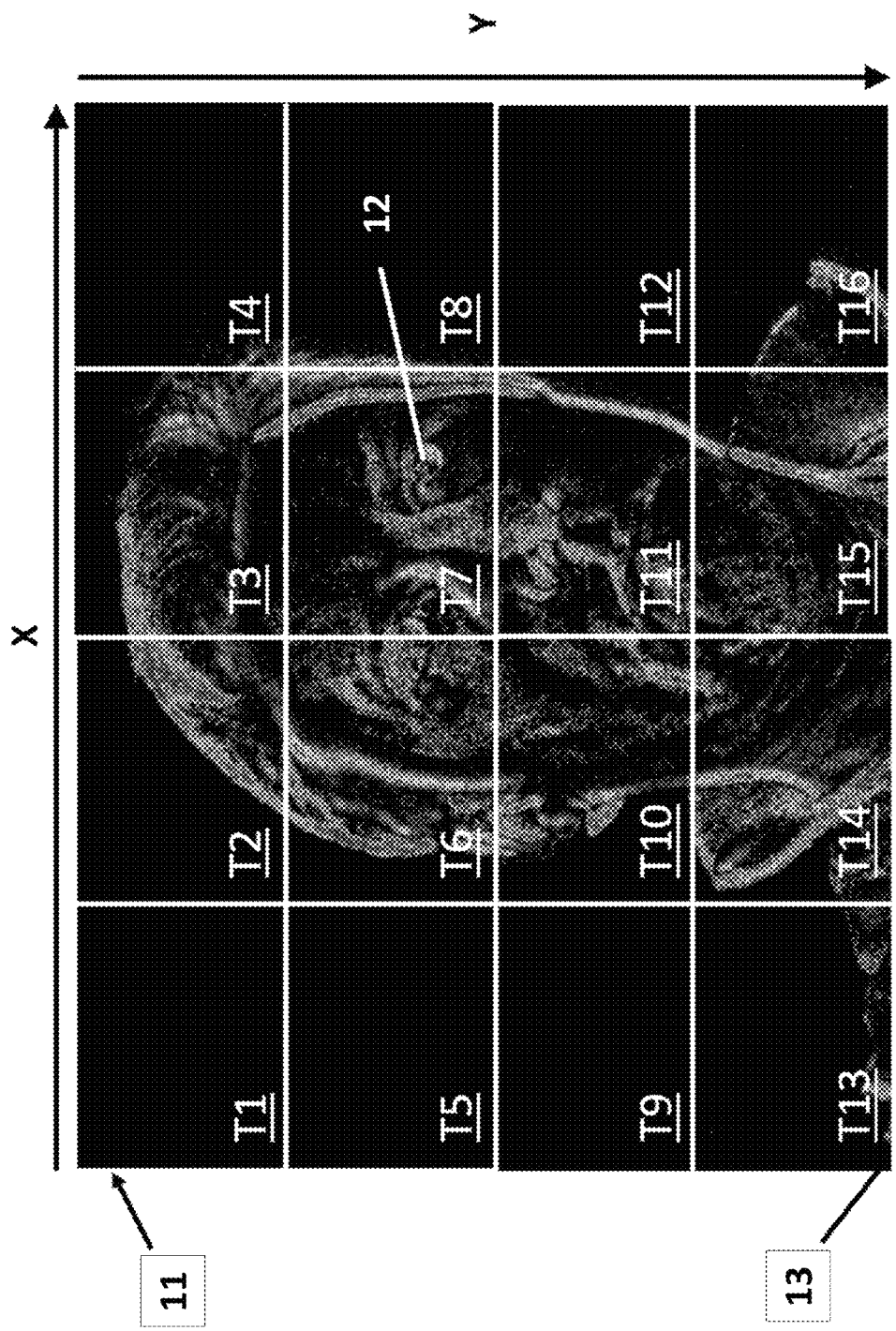
FIG. 2 shows an example of an image frame produced from an event camera that is pointed at a moving face, the image frame has been divided into sixteen tiles.

FIG. 2 shows an image frame 11 of the type to be provided from such a module connected to an event camera 33 that is pointed at a scene containing a face 12 according to an embodiment of the invention. The image frame 11 is composed of pixels, such as pixel 13. Pixels coloured black represent zero events i.e. no detected changes, and pixels coloured white represent one or more detected events i.e. a detected change.

The image is divided into tiles, each tile corresponding to at least one pixel. The sixteen tiles T1-T16 shown in FIG. 2 are in the form of a regular rectangular tessellation. The image 11 is X pixels wide by Y pixels high, thus there are N=X*Y pixels in the image. The size of the face 12 being imaged within the scene is such that many of the image tiles (T1, T5, T9) are black and at any given time do not involve any movement. However, the face 12 in the centre of the imaged scene has moved and thereby generated event packets, particularly at moving edge features of the face 12.

The image frame generated in FIG. 2 can be derived from event information generated across one or more event cycles, an event cycle being the smallest amount of time that the event camera can resolve, with each event cycle being allocated a unique time stamp. Where an image frame is derived from event information generated across more than one event cycle, the information at each pixel within the image frame can comprise a net polarity for the one or more events which might be recorded for the pixel during the plurality of event cycles.

As an event packet may be generated from any pixel detecting a change, in known methods, the total memory allocated for the tiles is sized to record changes from every pixel. Therefore, for every pixel of the event camera, within the memory allocated for the tiles, there will be a piece of memory in which the event information can be accumulated. It is an object of embodiments of the present invention to reduce this memory requirement.

Figure 3:
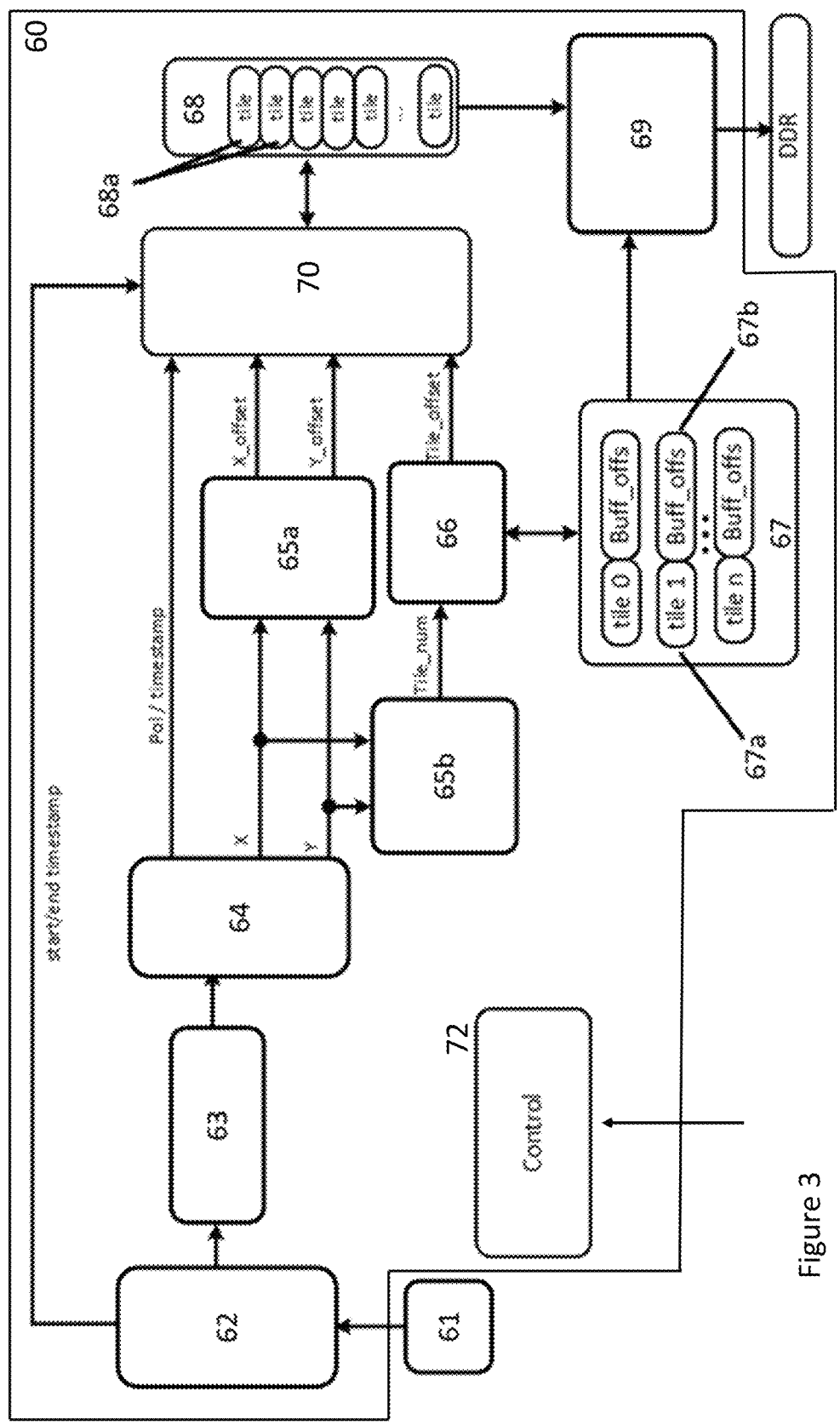
FIG. 3 shows schematically a module to process event packets from an event camera according to embodiments of the present invention.

FIG. 3 shows a schematic of an exemplary module 60 configured to produce image frame information from event camera information according to embodiments of the present invention. In the embodiment, the image frame information produced can comprise a channel of a tensor of the type employed in Scheerlinck et al and U.S. patent application Ser. Nos. 16/904,122 and 16/941,799 referenced above. Each tensor comprises one or more image frames with each image frame accumulating information from one or more event cycles.

Starting at the left of FIG. 3, an event packet stream 61 from an event camera is received by preliminary decoder 62. The received event packets comprise a pixel identifier and a time stamp for the event cycle and event information. The preliminary decoder can count received event packets starting with a given time stamp. The number of event packets and/or the time stamp extracted by the preliminary decoder 62 can provide the stop conditions that determine when image frame information for the tensor should be written out across a bus into main memory (DDR) as explained below.

Note that image information can be written across the bus into main memory in blocks, so reducing the bus overhead of writing event information from the event camera into main memory on an event packet-by-packet basis.

When a multi-frame tensor is being employed by downstream modules or applications (not shown), each image frame can be written into a FIFO portion of main memory with the newest image frame replacing the oldest frame. Alternatively, if event information for multiple image frames is to be accumulated within the module 60, then the storage required for each frame would effectively be duplicated vis-à-vis the single frame example shown in FIG. 3.

In any case, the stop conditions can be common to all the image frames for which event information has been accumulated within the module 60, to a subset of the image frames, or specific to each image frame.

In the embodiment, the event packets processed by the preliminary decoder 62 pass into an events buffer 63 to absorb fluctuations in event packet frequency. In some embodiments, the events buffer 63 is a FIFO buffer. If an excessive number of event packets and/or an excessive rate of event packets is detected, an events buffer overflow can be recorded. The events packets in the buffer or the events subsequently received for a predetermined time may be discarded to allow the system to continue despite the buffer overflow.

Other techniques may be employed to avoid such overflow or to avoid the use of the buffer 63, such as providing parallel paths for receiving and accumulating event packet information.

The events packets in the events buffer 63 are subsequently processed by an event decoder 64. The event decoder 64 extracts information from each processed event packet. For each event packet, the extracted information comprises the x column and y row of the event from the pixel identifier, the polarity of the event and the timestamp.

The x, y values that are extracted of the event decoder are processed in two ways. Firstly, the x, y values are processed by an intra-tile locating module 65a to find the respective intra-tile location. This can be achieved without requiring extra information. For example, if a 100 pixel wide by 100 pixel high image is divided into a rectangular grid of 10 pixel squares, the operations "x modulo 10" and "y modulo 10" will determine an intra-tile location for any given event.

Secondly the x, y values are processed by a tile identifying module 65b to identify the tile in the image (T1 . . . T16 in FIG. 2) that includes the location from which the event is generated. The output of the tile identifying module 65b is an identified tile. The identified tile is then processed in a tile table management module 66 that is in communication with a tile table 67 stored in memory local to the module 60.

The tile table 67 comprises one or more records, with each record comprising a tile number 67a and a memory address 67b in a tile buffer 68. In each record, the memory address 67b of the record gives an offset in the tile buffer 68 for the memory assigned to the specified tile number 67a. As the offsets specify the starting position in memory for a tile, all offsets are separated by at least the memory required to store one tile.

The tile buffer 68 comprises memory that has been allocated for a set number of tiles 68a. In at least one mode of operation, the set number of tiles 68a is less than the total number of tiles needed to form a complete image frame.

Each image frame will have its own tile buffer 68 and tile table 67 with the time stamp from the event decoder 64 being used to determine the image frame and associated tile buffer for a received event packet.

It should be noted that in the present example, where only one tile buffer 68 and tile table 67 are shown, the buffer information needs to be written to main memory before it can be refreshed with event information for the next image frame. However, when there is more than one tile buffer, a first subset of buffers may be accumulating event packet information whilst a different subset of tile buffers is being written out to main memory with the operations performed on the subsets then being switched.

The tile table management module 66 interrogates the records of the tile table 67 to see if any record 67a has a tile number that matches the identified tile for an incoming event. If a record is found that matches the identified tile, the memory address for the matched record is returned to the tile management module 66.

If there is no record matching the identified tile and if there is space in the tile buffer 68, the tile table management module 66 adds a new record for the identified tile to the tile table 67 and assigns memory in the tile buffer 68 for that identified tile. The starting address of assigned memory in the tile buffer 68 is also recorded in the tile table 67 as the memory address of the new record.

The tile offset from the matched record or new record in the tile table 67 is then combined with the intra-tile x,y pixel offset by a tile formatter 70. The tile offset determines the start of the assigned memory in the tile buffer 68 for the tile, and the intra-tile offset determines where within the assigned memory the event information should be directed.

Consequently, the memory address in the tile buffer for the processed event packet is determined by the tile formatter 70. Note that if the tile buffer 68 is to accumulate information for more than one event cycle in a given image frame, then it is possible that event information from more than one event will have accumulated at a given location in the tile buffer 68. In this case, the tile formatter 70 needs to first read the value at the address and then add this to the current value for the latest event before writing the result back to the location in the tile buffer 68. (This accumulation could of course be done in one operation with dedicated hardware.)

The counts from the preliminary decoder 62 are monitored and an image frame can be considered complete once a requisite number of event packets for an image frame have been received or once a time stamp extracted from a received event packets reveals that a time outside a range for an image frame has been reached. (If it can be assumed that events 61 are provided from the event camera in order, then the first timestamp with a number indicating an event cycle following the timestamp for a previous event cycle indicates that no more events will be received for the previous event cycle. If this is the last event cycle whose events are to be accumulated in an image frame, the frame may then be written to main memory.)

For each complete image frame, the data in the tile buffer 68 can be processed with a map writing module 69. The map writing module 69 receives tile data from the tile buffer 68 and uses the information in the tile table 67 to deduce the mapping between the tile data and the image frame. As the tile buffer 68 does not comprise all the data needed to produce a complete image, the map writing module 69 fills the remainder of the image. The filled in values can be blank, null or especially in regions close to the edges of tiles which have been stored in the tile buffer, values that are extrapolated or interpolated from the data that was in the tile buffer. The image frame information that is produced is communicated over the AXI bus to main memory DDR for recording or use by other downstream modules or applications.

As mentioned above, in normal operation, an event packet may be received that relates to a tile that has no memory assigned in the tile buffer 68, which causes the number of tiles for which information is stored in the tile buffer 68 to be increased. However, this is not possible if the tile buffer for an image frame is full e.g. all of the memory in the buffer has already been assigned to other tiles. In this case, there are a number of possible actions that the system can undertake depending on the configuration including either: ignoring event information for all tiles which are already not stored in the tile buffer for an image frame; or attempting to flush tiles from within the tile buffer which indicate that they may not accumulate sufficient information for the given image frame.

In some embodiments, there may be further constraints on whether a tile is added to the tile buffer. For example, a downstream application or module may signal to the module controller 72 from across the system bus that one or more regions of the image are irrelevant. So as explained in U.S. patent application Ser. Nos. 16/904,122 and 16/941,799 referenced above, one application for a multi-frame tensor provided by the module 60 into memory is for a downstream neural network to identify an object of interest within the field of view of the camera—in the present example, this may comprise coordinates for a box bounding the face 12. These coordinates can be fed by the downstream neural network back to the controller 72 so that if an event packet relates to an identified tile outside of this box, that is one of the tiles marked as irrelevant. Then even if there is space in the tile buffer 68, the table management module 66 will not assign the identified tile but will merely discard the event packet. In this way, the system can further reduce the memory that is required.

Note that as well as having a lower temporal resolution than possible by accumulating event information for more than one event cycle in an image frame, the tile buffer 68 may also store event information at a lower spatial resolution than is used for image frame information written to main memory DDR. Thus, with for example, 2×2 downsampling, event information from 4 pixels of the event camera may be written into a common location in the tile buffer. This information may then be upsampled as required by the map writing module 69 when writing the image frame information to main memory DDR.

In the exemplary application mentioned above, the module 60 can generate image frame information with each image frame accumulating event information for a fixed number of one or more event cycles.

The module 60 can continue to do so, until a downstream module or application signals to the controller 72 that in addition or in the alternative to the image frame information it had been producing, it should provide an image frame in which event information is accumulated, possibly for only a limited region of interest within the image until a given number of events has been counted by the preliminary decoder 62. Once this count has been reached, the map writing module 69 can write the image frame to main memory 69. This information accumulated in this image frame, possibly from only a limited region of interest, can then be used similarly to the technique described in Scheerlink et al and as described in U.S. patent application Ser. Nos. 16/904,122 and 16/941,799 referenced above to reconstruct a textural image from event information; or indeed for any other application including for example, blink detection where the region of interest may only include the eye regions of the face 12.

At any stage, the module 60 can then be requested to switch back to producing frames using just the first mode of operation with each image frame accumulating event information for a fixed number of one or more event cycles.

In a still further possible mode of operation where the module comprises a respective tile buffer and tile table for multiple image frames and in particular where the tile formatter 70 can downsample information being written into the tile buffer 68, a downsampled image frame which accumulates event information over a large number of event cycles or from a threshold number of events, especially events occurring in background portions of the image, for example, outside the face region 12 of FIG. 2 can be generated. When such an image frame is written to main memory DDR, it can be used by downstream modules or applications to reconstruct a textural background image of the scene being imaged by the camera 33. The techniques disclosed in PCT Application No. PCT/EP2020/073928 (Ref: FN-654-PCT), the disclosure of which is herein incorporated by reference, in which the camera 33 includes an actuator which can be triggered to cause a change in the light field incident on the surface of the event-sensor to generate a set of events from pixels distributed across the surface of the event-sensor can also be employed to cause the event sensor to generate the required number of events to produce an image frame with the required information to generate such a textural image. In this mode of operation, as downsampling is used, the tile table 67 and associated buffer 80 may comprise information for all tiles of the image, but with the lower resolution, this may involve excessive memory.

Figure 4:
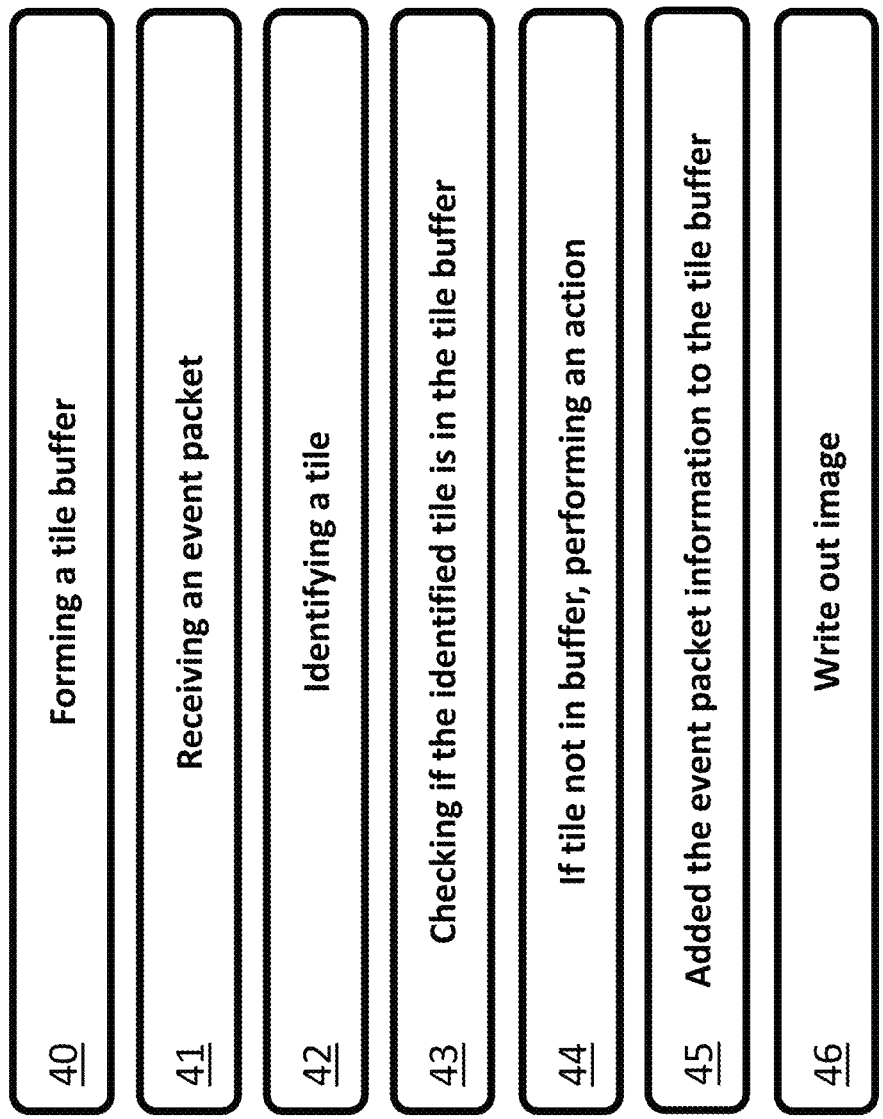
FIG. 4 shows the steps performed when processing event packets from an event camera according to an embodiment of the present invention.

FIG. 4 shows steps for a method which can be performed in the module 60 for processing a stream of event packets from an event camera in accordance with an embodiment of the present invention. In a first step 40, a tile buffer 68 is established for an image frame. Next, an event packet is received 41 and an image tile of the event packet is identified 42. The tile buffer is then checked 43 to see if memory has been assigned for the identified tile in the tile buffer 68. If so, the information from the event packet is added 45 to the tile buffer 68. In step 44, if the tile buffer has not been assigned memory for the identified tile, an action is performed including either: assigning 44a memory for the identified tile in the tile buffer 68 and adding this offset to the tile table; if the tile buffer/table is full, flushing (not shown) little used tiles from the tile buffer/table to allow memory for the identified tile to be assigned in the tile buffer 68 and the tile table 67; or if the tile buffer/table is full, ignoring the event packet information (and possibly reporting an overflow 44b). Once the stop conditions for an image frame have been satisfied, the tile buffer 68 is then written out 46 to form an image frame.

Figure 5:
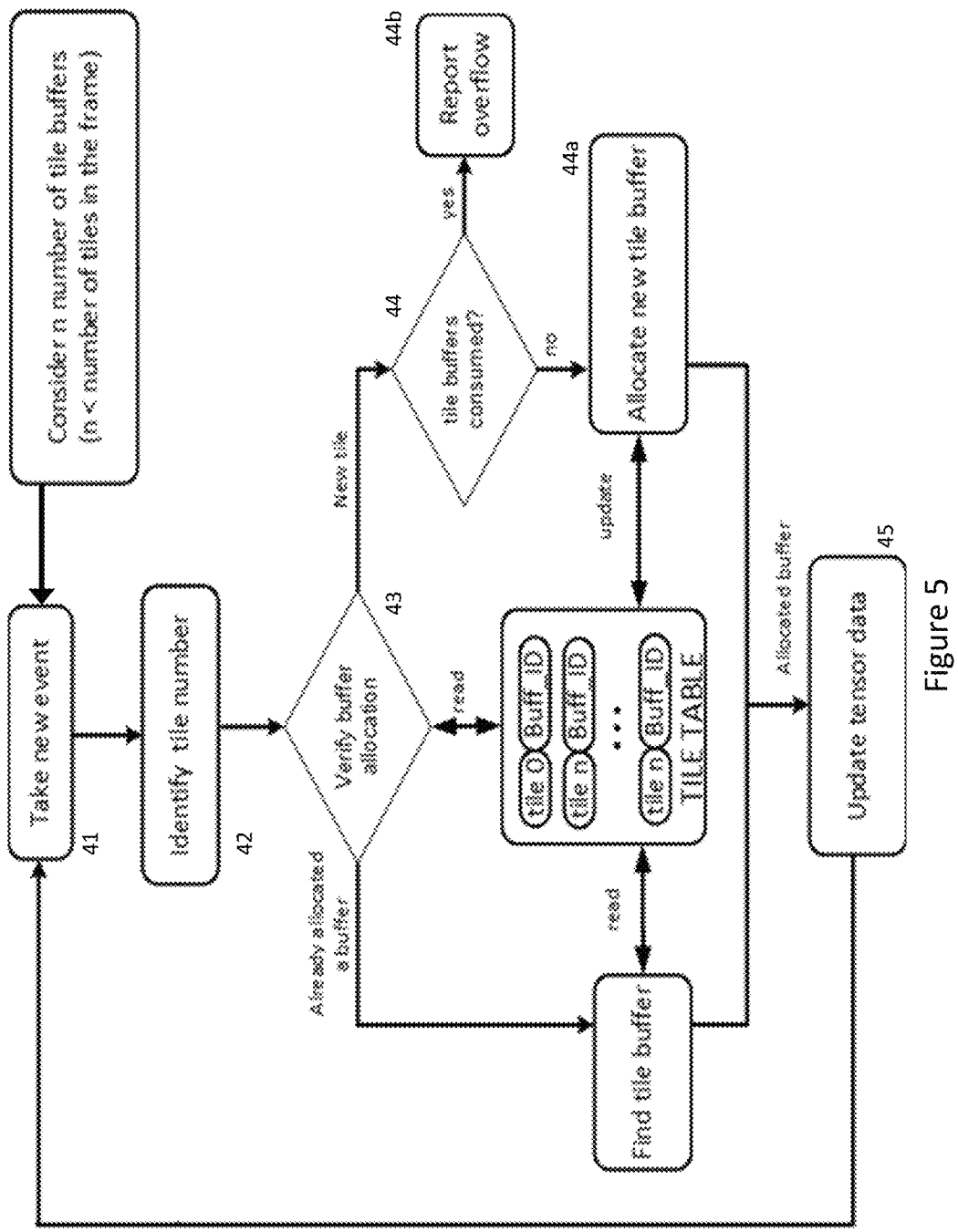
FIG. 5 is a flow diagram corresponding to a method to process events packets from an event camera according to an embodiment of the present invention.

FIG. 5 provides a flow chart that illustrates the operation of this method. Any image of an event camera may be divided into N' tiles, as demonstrated in FIG. 2. Each tile corresponds to a part of the image and therefore corresponds to one or more pixels, thus N'<N. In the present invention, the tile buffer 68 is formed 40 that comprises memory for only a subset of the N' tiles. The tile buffer 68 is associated with a tile table 67 which comprises records so that for each tile that is stored in the tile buffer 68 there is a record in the tile table 67. Each record relates to a corresponding tile and comprises the number of the corresponding tile and a memory address that has been assigned for the corresponding tile. The memory address may be an offset from a known memory address or an absolute memory address. The size of the tile buffer may be fixed or adjustable in use.

Receiving 41 an event packet means receiving an event packet, which is a data packet in a known predetermined format, from an event camera. The predetermined format varies according to the specific configuration of the event camera. For some embodiments of the present invention, each event packet is an indication of the pixel that detected the event. As the locations of the pixels are known, this indication can be used to determine a location for each detected event. In some embodiments, the event packet may also include a time stamp corresponding to when the event was detected and/or event information, which may include at least one of: a polarity of the event, a measure of brightness, and a measure of a difference in brightness.

As the received event packet determines a location, the location can be used to identify 42 the tile corresponding to that location. As an example, consider the image in FIG. 2 and a first event packet indicating a first pixel (first row, first column) and a second event packet indicating the last pixel (last row, last column). The first event packet would correspond to a first tile T1 and the second event packet would correspond to a sixteenth tile T16.

Once the tile corresponding to an event packet has been identified, the tile buffer 68 needs to be checked 43 to see if memory in the tile buffer 68 has been assigned for the identified tile. This check is performed by searching the records of the tile table 67 to see if any record matches i.e. comprises the identified tile.

If a record is found in the tile table 67 that matches the identified tile, information about the event from the event packet will be added 45 to the tile buffer 68. To add the event, a memory address for the identified tile is determined from the matched record. The location of the event can then be analysed to determine the location of the event within the identified tile i.e. the intra-tile location. The memory address for the identified tile is then combined with the intra-tile location to determine the address in the tile buffer 68 that should record the information relating to the event packet. The determined address in the tile buffer is then read (if an image frame accumulates information for more than one event cycle) and the event information is added to the existing value or the existing value is incremented/decremented according to the polarity of the event information.

If no record is found in the tile table 67 with the identified tile but there is space remaining in the tile buffer 68, i.e. not all the tile buffer 68 has been allocated, the tile buffer can be adjusted to allocate memory for the identified tile. Allocating the memory for the identified tile comprises increasing the memory allocated to the tile buffer 68 for the image frame to cover another tile and adjusting the tile table 67 by adding a new record. The new record comprises the identified tile and the memory address defining the newly allocated memory in the tile buffer.

If no record is found in the tile table with the identified tile and there is no space remaining in the tile buffer i.e. a tile buffer overflow condition. In a tile buffer overflow condition, at least one action can be performed depending on the configuration of the system. In one configuration, the system marks the tile buffer as overflowing. Marking the tile buffer as overflowing avoids misleading other systems that may access the downstream data. The system may then terminate processing. Alternatively, the system will proceed by discarding further received event packets until the tile buffer empties or proceed by immediately emptying the tile buffer. Emptying the tile buffer may comprise forming the currently recorded information into one or more image or discarding the information in the tile buffer without forming any image. Discarding information during an overflow condition ensures that the system is always operable even if some information is being lost.

In some configurations, the tiles in the tile buffer are processed in a thresholding process to remove one or more tiles with less useful information than other tiles and thereby free space in the tile buffer. The thresholding process aggregates the information in each tile in the tile buffer. For each tile, if the aggregated value is smaller than a threshold, the tile is removed from the tile buffer and the record of the removed tile is removed from the tile table 67. In this way, one or more tiles with low numbers of events can be removed. This thresholding process helps to avoid wasting memory on tiles that have only been included in the tile buffer due to rare noise generated events.

The thresholding process can also be repeated with a higher threshold every time a tile buffer condition overflows occurs. In some embodiments, the higher threshold is the previous threshold multiplied by alpha, where alpha is an over-unit number. By adjusting alpha, noise can be increasing suppressed.

The accumulation of the event information from the event packets into the tile buffer continues until at least one stop condition is reached. One possible stop condition is the processing of a set number of event packets for an image frame. Another possible stop condition is detecting an event packet with a time stamp that is outside the range of time stamps that are being accumulated for an image frame.

Once at least one stop condition has been processed, the tile buffer will be written out 46 and the tile buffer and associated tile table will be emptied. In other words, once all required information has been accumulated in the tile buffer, the accumulated event information in the tile buffer and the mapping in the tile table can be used to write out one or more image frames.

In some variants of the above, a simple filtering mechanism can be used that ignores, by not allocating tile buffer memory for, tiles affected by a small number of events. As an example of a filtering mechanism, the addition of a new tile in the tile buffer may be prevented until a set number of event packets with a location corresponding to the new tile are recorded.

The invention claimed is:

1. A method of producing an image frame from a series of event packets received from an event camera, each event packet including event information indicating an x,y pixel location of said event camera, an indication of a change of detected light intensity incident at said x,y pixel location and an event cycle at which said event occurred, the image frame being defined by an array of tiles, each tile corresponding to a plurality of pixel locations, the method comprising:

forming a tile buffer of memory sized to accumulate event information for a subset of image tiles, the tile buffer having an associated tile table that determines a mapping between each tile of the image frame for which event information is accumulated in the tile buffer and the image frame;

for each event packet in the series of event packets received from the event camera:
identifying an image tile corresponding to the pixel location of the event packet;
responsive to the tile buffer storing information for at least one other event corresponding to said image tile, adding the event information to the tile buffer;
responsive to the tile buffer not storing information for at least one other event corresponding to said image tile and responsive to said tile buffer being capable of accumulating event information for at least one more tile, adding said image tile to the subset of tiles for which event information is accumulated in said tile buffer; and responsive to a stop condition, forming the image frame by using the tile table to map the information in the tile buffer to the image frame.

2. The method of claim 1, further comprising,
responsive to the tile buffer not storing information for at least one other event corresponding to said image tile and said tile buffer not being capable of accumulating event information for at least one more tile, indicating a tile buffer overflow.

3. The method of claim 2, comprising, responsive to an indication of buffer overflow, discarding the event packet information.

4. The method of claim 2, comprising, responsive to an indication of buffer overflow, flushing information for at least one tile from said tile buffer.

5. The method of claim 4, wherein said flushing comprises:
for each tile for which event information is accumulated in the tile buffer:
aggregating the information for the tile into an aggregated value; and
flushing the tile from tile buffer if the aggregated value is less than a threshold value.

6. The method of claim 1, the method further comprises:
counting a number of events having an event cycle corresponding to one or more event cycles for which event information is being accumulated for an image frame
wherein said stop condition comprises said count exceeding a threshold.

7. The method of claim 1, wherein said stop condition comprises receiving an event packet for an event cycle occurring after a range of event cycles for which event information is being accumulated for an image frame.

8. The method of claim 1 comprising providing a tile buffer and an associated tile table for each of a plurality of image frames for which image information is to be accumulated.

9. The method of claim 8 wherein forming the image frame comprises writing the image frame information across a system bus into a system memory.

10. The method of claim 9 further comprising accumulating event information for one image frame at the same time as writing image frame information for another image frame.

11. The method of claim 8 wherein the stop condition for one image frame is different than the stop condition for another frame.

12. The method of claim 1 comprising discarding event information corresponding to image tiles outside a region of interest for an image frame.

13. The method of claim 1 comprising accumulating event information in said tile buffer at a spatial resolution less than or equal to the spatial resolution of said formed image frame.

14. A module comprising an interface configured to receive said events from said event camera and an interface to write image frame information across a system bus to memory, said module being configured perform the method of claim 1.

15. A vehicle comprising the module of claim 14 operatively coupled to an event camera and to said memory across said system bus.

* * * * *